United States Patent
Nerney (12)

(10) Patent No.: US 9,558,678 B1
(45) Date of Patent: Jan. 31, 2017

(54) NEAR-INFRARED IMAGER TRAINING DEVICE

(71) Applicant: Michael E. Nerney, Largo, FL (US)

(72) Inventor: Michael E. Nerney, Largo, FL (US)

( * ) Notice: Subject to any disclaimer, the term of this patent is extended or adjusted under 35 U.S.C. 154(b) by 246 days.

(21) Appl. No.: 14/548,943

(22) Filed: Nov. 20, 2014

(51) Int. Cl.
G09B 23/28 (2006.01)
G09B 23/30 (2006.01)

(52) U.S. Cl.
CPC ............ *G09B 23/285* (2013.01); *G09B 23/30* (2013.01)

(58) Field of Classification Search
USPC ............... 434/262, 267, 268, 272, 273
See application file for complete search history.

(56) References Cited

U.S. PATENT DOCUMENTS

| | | | | |
|---|---|---|---|---|
| 2,995,832 A * | 8/1961 | Alderson | ............... | A61M 5/00 434/268 |
| 4,182,054 A * | 1/1980 | Wise | ............... | G09B 23/285 434/268 |
| 5,839,904 A * | 11/1998 | Bloom | ............... | G09B 23/285 434/268 |
| 6,205,871 B1 * | 3/2001 | Saloner | ............... | G09B 23/28 430/325 |
| 6,997,719 B2 * | 2/2006 | Wellman | ............... | G09B 23/285 434/272 |
| 7,059,168 B2 * | 6/2006 | Hibi | ............... | G09B 23/286 434/272 |
| 7,255,565 B2 * | 8/2007 | Keegan | ............... | G09B 23/303 434/267 |
| 7,532,746 B2 | 5/2009 | Marcotte et al. | | |
| 7,931,471 B2 * | 4/2011 | Senagore | ............ | G09B 23/285 434/267 |
| 8,408,920 B2 * | 4/2013 | Speller | ............... | G09B 23/285 434/267 |
| 8,608,484 B2 * | 12/2013 | Kalafut | ............... | G09B 23/32 434/262 |
| 8,613,621 B2 * | 12/2013 | Hendrickson | ........ | G09B 23/303 434/267 |

(Continued)

OTHER PUBLICATIONS

Veinlite Vein Finders website home page, www.veinlite.com accessed Mar. 19, 2015.

(Continued)

*Primary Examiner* — Kurt Fernstrom
(74) *Attorney, Agent, or Firm* — Ronald E. Smith; Nicholas Pfeifer; Smith & Hopen, P.A.

(57) ABSTRACT

A training device includes a base formed of a thermoplastic elastomeric material that transmits near-infrared radiation and which re-seals after being punctured by a needle of the type used to draw blood from veins. A plurality of simulated veins is formed in the thermoplastic elastomeric material. Each simulated vein is an elongate cylindrical void or lumen formed in the thermoplastic elastomeric material. A blood-simulating and near-infrared absorbing fluid is disposed in each lumen of the plurality of simulated veins. A first simulated vein is formed near a top surface of the thermoplastic elastomeric material, a second simulated vein is positioned further from the top surface, and a third simulated vein is positioned still further from the top surface. A white-in-color cover overlies the base to reflect a computer projected image representing underlying near-infrared absorbing structures that simulate veins that are detectable by near-infrared vein imagers.

19 Claims, 2 Drawing Sheets

(56) References Cited

U.S. PATENT DOCUMENTS

2010/0179428 A1* 7/2010 Pedersen ............... A61B 8/00
600/443
2015/0072328 A1* 3/2015 Nystrom ........... A61M 5/14566
434/262

OTHER PUBLICATIONS

VeinViewer superior light based technology products, website page, www.christiemed.com/products/veinviewer-models accessed Mar. 19, 2015.
AccuVein AV400 Vein Viewing System website page, www.accuvein.com/products/catalog/av400-vein-viewing-system accessed Mar. 19, 2015.

* cited by examiner

NEAR-INFRARED IMAGER TRAINING DEVICE

BACKGROUND OF THE INVENTION

1. Field of the Invention

This invention relates, generally, to devices that help clinicians practice finding and accessing veins. More particularly, it relates to a device having utility with near-infrared vein imagers.

2. Description of the Prior Art

Gaining access to a vein with a hypodermic needle requires no visual or mechanical aid if the vein is near the skin surface of a healthy patient and is thus visible to the unaided eye. Veins that are not near the surface or which may be difficult to see due to other reasons including age, health, and the condition of the patient's skin are much more challenging to access. One prior art solution is to apply light by fiberoptic or LED technology directly to the skin to transilluminate and therefore highlight otherwise difficult to see veins. The Veinlite® vein finder performs that function.

Visible light-reliant vein finders have less utility finding veins that are not near the surface or which are hard to see for other reasons. Such devices also have a very limited amount of area that can be visualized at one time (typically 31 mm at most).

A device that does not rely upon visible light is sold under the trademark Veinsite® hands-free vascular imaging system; it is worn as head gear and is disclosed in U.S. Pat. No. 7,532,746 which patent is hereby incorporated by reference into this disclosure. Near-infrared radiation is aimed at a patient's limb from emitters located in the Veinsite® headgear and an integrated infrared sensitive video camera images the same area. The computer and optically processed video camera image is displayed on a grayscale LCD screen positioned in front of the user's eyes. Hemoglobin contained in the blood vessels absorbs the near-infrared light while other tissues scatter the radiation. The contrast between absorption and scattering is displayed on the LCD screen, thereby allowing the user to perceive the location of underlying vessels that are not easily seen with an unaided eye. With the displayed image, an intravenous catheter or hypodermic needle can be effectively guided to access the vessel. If needed, the user can see the treatment area directly with the unaided eye by directing the eyes downward, i.e., not observing the display screen. This device also allows viewing of large areas of the skin simultaneously.

Other devices that use near-infrared radiation for vein detection and which include a projector are known commercially as the VeinViewer® and the AccuVein® vein viewing system.

The term "near-infrared" as used in this disclosure includes infrared radiation as well for claim interpretation purposes. "Near-infrared" radiation is defined in Wikipedia as having a wavelength in the range of from about 800 nm to 2500 nm and "infrared radiation" is defined by Wikipedia as having a wavelength from about 700 nm to 1 mm (one millimeter being one million nanometers). Visible light is defined as having a wavelength from about 390 nm to 700 nm. The infrared range of 700 nm to 1,000,000 nm clearly includes the near-infrared range of 800 nm to 2500 nm.

Although these devices perform well, the only training they provide is on-the-job training, i.e., the clinician uses the device for the first time on a patient.

Thus there is a need for a training device that in combination with near-infrared vein finders simulates the appearance and relative depths of veins in a way that enables a clinician to practice intravenous access before locating a vein in a patient. Development of psychomotor skills prior to clinical and live patient use provides greater chance of procedural success and serves to lessen patient discomfort.

Prior art vein finding practice devices for visual vein access practice have major drawbacks that do not allow their use with near-infrared devices. First, they are made of materials that do not transmit near-infrared light. Secondly, the liquid fluid material used to simulate blood does not absorb near-infrared light. Another drawback is that simulation of the relative depth of the vessel cannot be achieved.

There is a need for a training device for near-infrared imagers formed of a material that re-seals itself after puncture and subsequent retraction of a needle. The device would have non-toxic blood-simulating liquid fluid in the simulated veins, and said liquid fluid would be visible under near-infrared imaging. Moreover, veins that are close to the surface would be imaged as clear black images and veins further from the surface would be imaged as gray images that appear lighter gray and have less edge definition with increased depth.

However, in view of the art considered as a whole at the time the present invention was made, it was not obvious to those of ordinary skill in the art how the needed training device could be provided.

SUMMARY OF THE INVENTION

The long-standing but heretofore unfulfilled need for a vein-finding training device having utility with near-infrared imagers is now met by a new, useful, and non-obvious invention.

The novel training device includes a base formed of a thermoplastic elastomeric material that transmits near-infrared radiation. At least one simulated vein is formed in the thermoplastic elastomeric material. Each of the simulated veins has a lumen in the form of an elongate cylindrical void formed in the thermoplastic elastomeric material that extends from a first end of the base to a second end of the base. A blood-simulating fluid that absorbs near-infrared radiation is disposed in each lumen.

The at least one simulated vein includes at least two simulated veins disposed in the thermoplastic elastomeric material at differing spacings relative to a top surface of the thermoplastic elastomeric material. The at least two simulated veins includes a first simulated vein formed near the top surface of thermoplastic elastomeric material and a second simulated vein positioned further from that top surface.

The at least two simulated veins includes a third simulated vein positioned still further from the top surface of the thermoplastic elastomeric material than the second simulated vein.

The base has a cuboid structure including a flat top surface, a flat bottom surface, a front side wall, a back side wall, and two end walls. Each simulated vein has a length that exceeds a length of the thermoplastic elastomeric material and is positioned with respect to the base so that opposite ends of each simulated vein extend out of the base at the opposite ends of the base.

A port is formed in each opposite end of each simulated vein so that each end is adapted to be placed into fluid communication with a hypodermic syringe or intravenous tubing to enable replenishment of the blood-simulating fluid The blood-simulating fluid in the respective lumens of the simulated veins is a non-toxic liquid fluid formed by adding a non-toxic, hydrophilic, infrared-absorbing dye to water.

The dyed water absorbs infrared and is visible to a near-infrared vein imaging device. The preferred dye is indocyanine green mixed with a non-toxic blue colorant at a ratio of about 0.01 gram of dye to 60 cc of water.

The thermoplastic elastomeric material is a thermoplastic elastomer preferably mixed with about forty (40) parts of mineral oil to about sixty (60) parts of the thermoplastic elastomer. The RTP Company website recites that all thermoplastic elastomers include crystalline and amorphous domains. Some are blends or alloys of crystalline and amorphous polymers, some are block co-polymers comprised of blocks of crystalline and amorphous domains along the same polymer chain. It is the crystalline domains that act as the "heat-fugitive cross-links" that give thermoplastic elastomers their thermoplastic character and the amorphous domains that give them their elastomeric character. The crystalline domains are typically referred to as the "hard" phase and the amorphous domains as the "soft" phase. While both phases contribute to the overall physical and mechanical properties of a thermoplastic elastomer, some key properties may be associated with one phase or the other thereby guiding the selection or design of a thermoplastic elastomer compound.

A colorant that transmits near-infrared radiation is added to the thermoplastic elastomeric material. The preferred colorant is a cobalt blue colorant; about 4.7 grams of the colorant is mixed with about 700 grams of the thermoplastic elastomeric material.

A cosmetic, non-functional support material is disposed in underlying, supporting relation to the thermoplastic elastomeric material and in overlying, abutting relation to the end walls of the base. The support material is also formed of a thermoplastic elastomeric material, is white-in-color, and reflects visible radiation.

A near-infrared radiation-diffusing material is added to the thermoplastic elastomeric material that forms the base. The preferred near-infrared radiation-diffusing material is talcum powder. About one gram of talcum powder is added to about one kilogram of the thermoplastic elastomeric material by weight as the thermoplastic elastomeric material is being formed so that the talcum powder is evenly mixed throughout the thermoplastic elastomeric material that forms the base.

The simulated vein positioned near the top surface of the base appears black with well-defined edges under near-infrared imaging. The simulated vein positioned within the base at a medium depth appears as a dark shade of gray with less well-defined edges, a simulated vein positioned further from the top surface than the medium depth simulated vein appears as a lighter shade of gray with even less well-defined edges as compared with the darker shade of gray.

Talcum powder is also coated on the top surface of the base. After the coating is manually swept off of the top surface so that a residue of talcum powder remains on the top surface. The residue, and the talcum powder that is evenly mixed throughout the thermoplastic elastomeric material forming the base, cooperate with one another to provide enhanced near-infrared radiation diffusing.

A cover, white-in-color, about two millimeters (2 mm) in thickness, is applied to the thermoplastic elastomeric material forming the base in overlying relation thereto. The cover is formed of a clear thermoplastic elastomer material that re-seals after puncturing and which transmits infrared radiation. The thermoplastic elastomer forming the cover includes a mixture of titanium dioxide. The mixture includes about eight to twenty four grams (8-24 grams) of titanium dioxide ($TiO_2$) for each one thousand grams (1000 gms) of the compound that forms said cover. The cover has utility in connection with projector-equipped near-infrared devices to reflect the visual projected image. The cover is not used with the prior art Veinsite® device since there is no projector in that device that needs a light background to project onto for visual reflection.

The primary object of the invention is to advance the art of clinician training devices in general and of vein-finding practice devices in particular.

A more specific object is to advance the art of clinician training devices that work with near-infrared radiation as distinguished from visible light, ultrasound, X-rays, or other imaging means.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1:
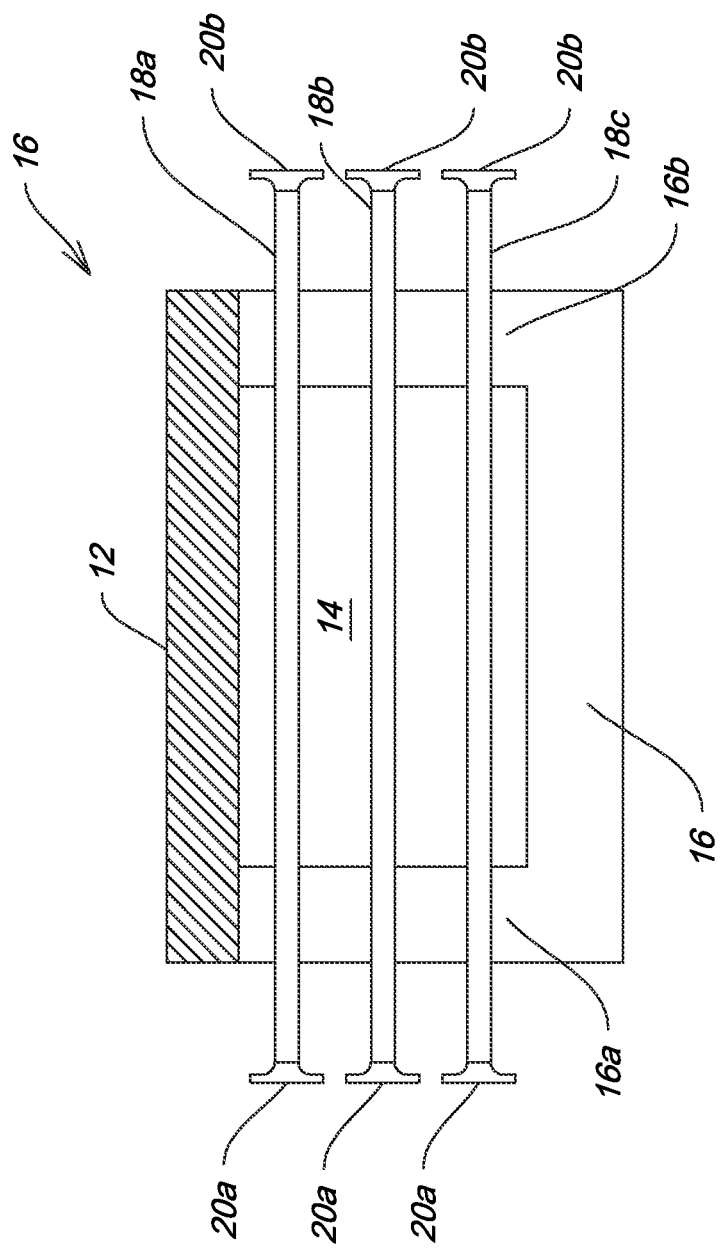
FIG. 1 is a sectional view of the novel structure, taken along line 1-1 in FIG. 2.

FIG. 1 depicts an illustrative embodiment of the novel structure which is denoted as a whole by the reference numeral 10.

Training device 10 in this embodiment has a white-in-color cover 12 that is preferably about two millimeters (2 mm) in thickness. It can be applied by differing methods, including paint application.

Cover 12 is used with projector-equipped near-infrared devices to reflect/transmit the visual projected image. Cover 12 is not used with the prior art Veinsite® device since there is no projector in that device that needs a light background to project onto for visual reflection.

The terms "reflect" and "transmit" as used in this disclosure have the same meaning, i.e., a material that reflects or transmits near-infrared radiation does not absorb near-infrared radiation. Reflected radiation is read and displayed on an output device.

Cover 12 is formed of a thermoplastic elastomeric material that re-seals after puncturing and which is clear to infrared radiation, i.e., cover 12 does not absorb but transmits such radiation. The preferred compound is sold under the trademark Versaflex® which is a clear, dielectric material sold by GLS corporation of McHenry, Ill. It is mixed with mineral oil in a ratio of 60/40 of said compound to oil. Titanium dioxide ($TiO_2$) is added to make the material visibly white-in-color. The ratio is between eight to twenty four grams (8-24 gms) of $TiO_2$ per one thousand grams (1000 gms) of said thermoplastic elastomeric material.

The base in which vein-simulating tubes are embedded is denoted 14 and is typically about 1.5 inches in thickness. As depicted in FIG. 1, base 14 underlies cover 12. Its starting material is preferably formed of the same compound that forms cover 12, i.e., Versaflex® compound. Other similar polymers, broadly referred to as thermoplastic elastomers, are within the scope of this invention. A cobalt blue colorant is added to the starting material of base 14 instead of titanium dioxide. Other colors that do not absorb near-infrared are within the scope of this invention. The preferred cobalt blue is Grumbacher Cobalt Blue oil paint mixed in a ratio of 4.7 grams per 700 grams of said Versaflex® compound.

Base 14, like cover 12, is also clear to near-infrared radiation, i.e., it transmits said radiation as distinguished from absorbing it as aforesaid.

Figure 2:
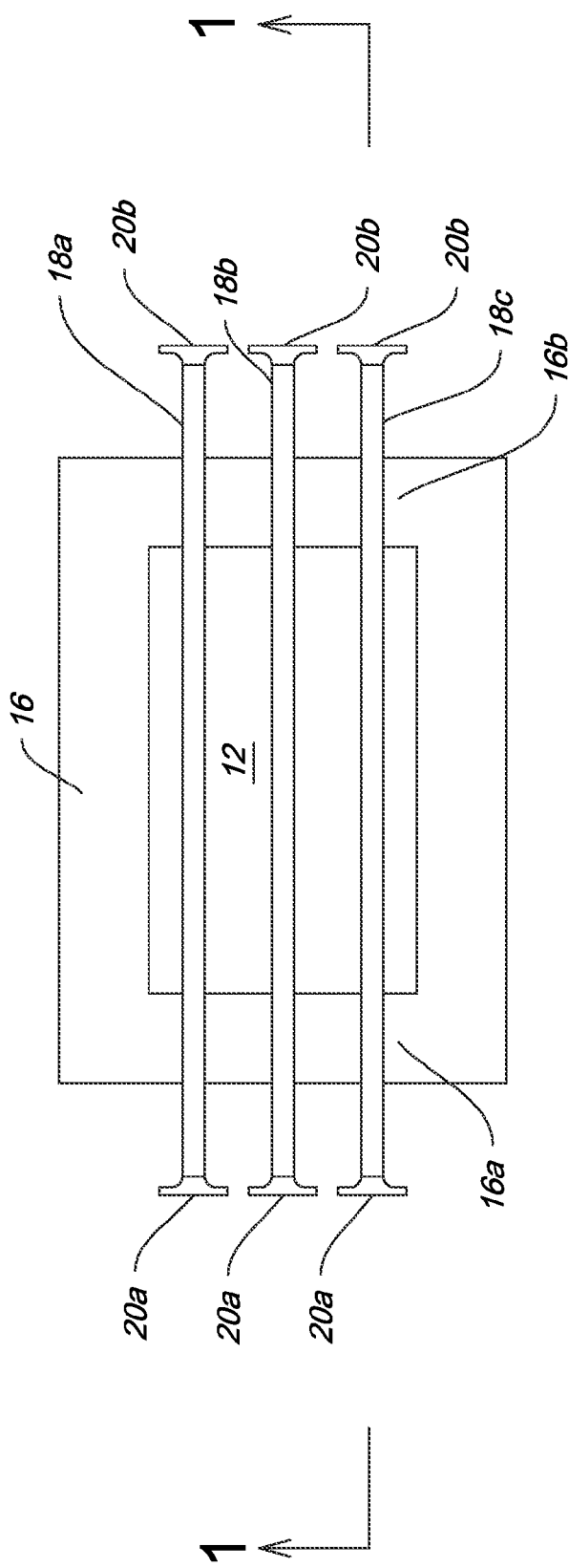
FIG. 2 is a top plan view of the novel structure.

Support 16 underlies base 14 and also overlies and abuts the two opposite end walls of base 14 as best understood from the top plan view of FIG. 2. Support 16 is also formed of the preferred thermoplastic elastomeric material and is colored white by the addition of titanium dioxide in about the ratio as in cover material 12.

Support 16 is primarily cosmetic as distinguished from functional. It serves to form a support surface so that a user will intuitively place support 16 on the table or desk selected to support novel practice device 10. This positions cover 12 or the uncovered top surface of base 14 in the position as depicted in the drawings so that a practice session may begin.

The simulated veins are formed as cylindrical voids in base 12. In FIGS. 1 and 2, a first simulated vein 18a is formed near the surface of base 14, a second simulated vein 18b is positioned further from the surface of base 14, i.e., at a distance that might be considered a medium depth, and a third simulated vein 18c is positioned still further from the surface of base 14, said number of veins and their respective positions being disclosed for illustrative purposes. The number of simulated veins is not limited, and any simulated vein may be positioned at any depth relative to the top surface of base 14.

Opposite ends of each simulated vein preferably extend through end walls 16a, 16b of support 16. A port 20a, 20b, 20c is formed in each opposite end of each simulated vein 18a, 18b, 18c, respectively, so that each end may be placed into fluid communication with a hypodermic syringe or intravenous tubing, not depicted. This enables replenishment of the blood-simulating fluid that occupies the veins. A trainee will use novel device 10 to aspirate liquid from the simulated veins by puncturing cover 12 and base 14. That liquid must be replenished, so such liquid is re-introduced into the simulated veins by injection at said ports.

The simulated blood in the respective lumens of the simulated veins is a non-toxic liquid formed by adding a non-toxic, hydrophilic, infrared-absorbing dye to water. The dyed water absorbs infrared and is therefore visible under a source of near-infrared radiation. The dye consists of indocyanine green or an analogue sold under the trademark New Indocyanine Green IR-820® by Sigma Aldrich and is preferably mixed with non-toxic blue colorant. A typical mixture is 0.01 gm of dye to 60 cc of water.

An infrared radiation-diffusing material is preferably added to base 14. In the preferred embodiment, about one gram of talcum powder is added to about one kilogram of the base material by weight as the base material is being formed so that the talcum powder is evenly mixed throughout the base material. This causes a shallow vein such as simulated vein 18a to appear black with well defined edges under near-infrared imaging, a medium depth simulated vein such as simulated vein 18b to appear as a dark shade of gray with less well defined borders, and a relatively deep depth simulated vein such as simulated vein 18c to appear as a lighter shade of gray with even less well defined edges as compared with said darker shade of gray.

The preferred tri-block compound also has a tacky, urethane-like feel if left untreated so it is preferred to coat talcum powder on the top surface of cover 12 in embodiments having cover 12 or on the top surface of base 14 in embodiments having no cover 12, sweeping off excess said talcum powder prior to use of training device 10. The sweeping off is performed manually so that a residue of talcum powder remains atop cover 12 or base 14, thereby removing the tacky feeling and replacing it with a pleasant, smooth feel. Significantly, the top surface residue and the mixed in or embedded talcum powder cooperate with one another to provide excellent radiation-diffusing properties.

The source of infrared light can be any commercially available source, such as the Veinsite® hands-free vascular imaging device or a projection-based vein finder which projects an image onto cover material 12.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:
1. A training device, comprising:
 a base formed of a thermoplastic elastomeric material;
 said thermoplastic elastomeric material transmitting near-infrared radiation;
 at least one simulated vein formed in said thermoplastic elastomeric material, said at least one of said simulated veins having a lumen;
 each lumen being an elongate cylindrical void formed in said thermoplastic elastomeric material that extends from a first end of said base to a second end of said base;
 a blood-simulating fluid disposed in each lumen of said at least one simulated vein; and
 said blood-simulating fluid absorbing said near-infrared radiation.
2. The training device of claim 1, wherein said at least one simulated vein includes at least two simulated veins disposed in said thermoplastic elastomeric material at differing spacings relative to a top surface of said thermoplastic elastomeric material.
3. The training device of claim 2, further comprising:
 said at least two simulated veins including a first simulated vein formed near said top surface of said thermoplastic elastomeric material and a second simulated vein positioned further from said top surface.
4. The training device of claim 3, further comprising:
 said at least two simulated veins including a third simulated vein positioned still further from said top surface of said thermoplastic elastomeric material than said second simulated vein.
5. The training device of claim 1, wherein said base has a cuboid structure including a flat top surface, a flat bottom surface, a front side wall, a back side wall, and two end walls.

6. The training device of claim 5, further comprising:
each simulated vein of said at least one simulated vein having a length that exceeds a length of said thermoplastic elastomeric material;
each simulated vein of said at least one simulated vein positioned with respect to said base so that opposite ends of each at least one simulated vein extend out of said base at said opposite ends of said base;
a port formed in each opposite end of each at least one simulated vein so that each end is adapted to be placed into fluid communication with a hypodermic syringe or intravenous tubing to enable replenishment of said blood-simulating fluid.

7. The training device of claim 6, wherein said blood-simulating fluid in the respective lumens of the at least one simulated veins is a non-toxic liquid fluid formed by adding a non-toxic, hydrophilic, infrared-absorbing dye to water, said dyed water absorbing infrared and being visible to a near-infrared vein imaging device.

8. The training device of claim 7, wherein said dye is indocyanine green mixed with a non-toxic blue colorant at a ratio of about 0.01 gram of said dye to 60 cc of water.

9. The training device of claim 1, further comprising:
said thermoplastic elastomeric material being a thermoplastic elastomer mixed with forty (40) parts of mineral oil to sixty (60) parts of said thermoplastic elastomer.

10. The training device of claim 1, further comprising:
a colorant that transmits near-infrared radiation added to said thermoplastic elastomeric material.

11. The training device of claim 10, wherein said colorant is a cobalt blue colorant.

12. The training device of claim 11, wherein about 4.7 grams of said colorant is mixed with about 700 grams of said thermoplastic elastomeric material.

13. The training device of claim 1, further comprising:
a support material disposed in underlying, supporting relation to said thermoplastic elastomeric material;
said support material also disposed in overlying and abutting relation to said end walls of said thermoplastic elastomeric material; and
said support material also being formed of a thermoplastic elastomeric material and being white-in-color and reflecting visible radiation.

14. The training device of claim 1, further comprising:
a near-infrared radiation-diffusing material added to said thermoplastic elastomeric material that forms said base.

15. The training device of claim 14, wherein said near-infrared radiation-diffusing material is talcum powder and wherein about one gram of said talcum powder is added to about one kilogram of said thermoplastic elastomeric material by weight as the thermoplastic elastomeric material is being formed so that the talcum powder is evenly mixed throughout the thermoplastic elastomeric material that forms said base;
whereby said simulated vein positioned near said top surface of said base appears black with well-defined edges under near-infrared imaging;
whereby said simulated vein positioned within said thermoplastic elastomeric material at a medium depth appears as a dark shade of gray with less well-defined edges; and;
whereby a simulated vein positioned further from said top surface than said medium depth simulated vein appears as a lighter shade of gray with even less well-defined edges as compared with said darker shade of gray.

16. The training device of claim 15, wherein talcum powder is also coated on said top surface of said base and after said coating is manually swept off of said top surface so that a residue of talcum powder remains on said top surface, said residue and said talcum powder that is evenly mixed throughout said thermoplastic elastomeric material forming said base cooperating with one another to provide enhanced near-infrared radiation diffusing.

17. The training device of claim 1, further comprising:
a cover, white-in-color, that is about two millimeters (2 mm) in thickness and which is applied to said thermoplastic elastomeric material forming said base in overlying relation to said thermoplastic elastomeric material forming said base.

18. The training device of claim 17, further comprising:
said cover being formed of a clear thermoplastic elastomer that re-seals after puncturing and which transmits infrared radiation.

19. The training device of claim 18, further comprising:
said thermoplastic elastomer forming said cover including a mixture of titanium dioxide, said mixture including about eight to twenty four grams (8-24 grams) of titanium dioxide ($TiO_2$) for each one thousand grams (1000 gms) of said thermoplastic elastomer that forms said cover.

* * * * *